No. 685,517. Patented Oct. 29, 1901.
F. H. LIPPINCOTT.
ICE SHAVING MACHINE.
(Application filed Apr. 11, 1900.)

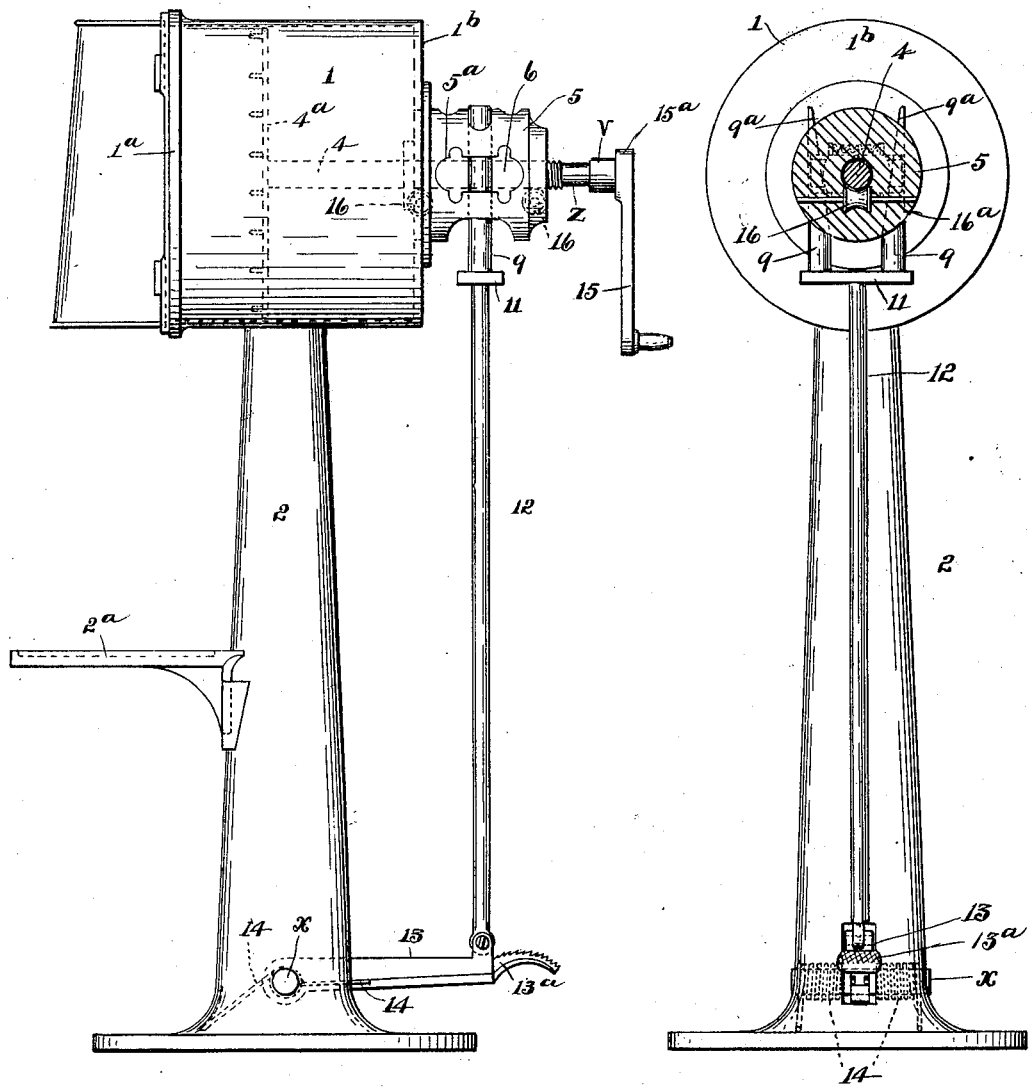

(No Model.) 2 Sheets—Sheet 2.

WITNESSES:
Walter C. Pusey
A. V. Groups

INVENTOR
Fisher H. Lippincott,
BY Joshua Pusey,
ATTORNEY

UNITED STATES PATENT OFFICE.

FISHER H. LIPPINCOTT, OF PHILADELPHIA, PENNSYLVANIA, ASSIGNOR TO AMERICAN SODA FOUNTAIN COMPANY, OF JERSEY CITY, NEW JERSEY, A CORPORATION OF NEW JERSEY.

ICE-SHAVING MACHINE.

SPECIFICATION forming part of Letters Patent No. 685,517, dated October 29, 1901.

Application filed April 11, 1900. Serial No. 12,449. (No model.)

*To all whom it may concern:*

Be it known that I, FISHER H. LIPPINCOTT, a citizen of the United States, residing at the city and county of Philadelphia, in the State of Pennsylvania, have invented certain new and useful Improvements in Ice-Shaving Machines, of which the following is a full, clear, and exact description, reference being had to the accompanying drawings, of which—

Figure 3:
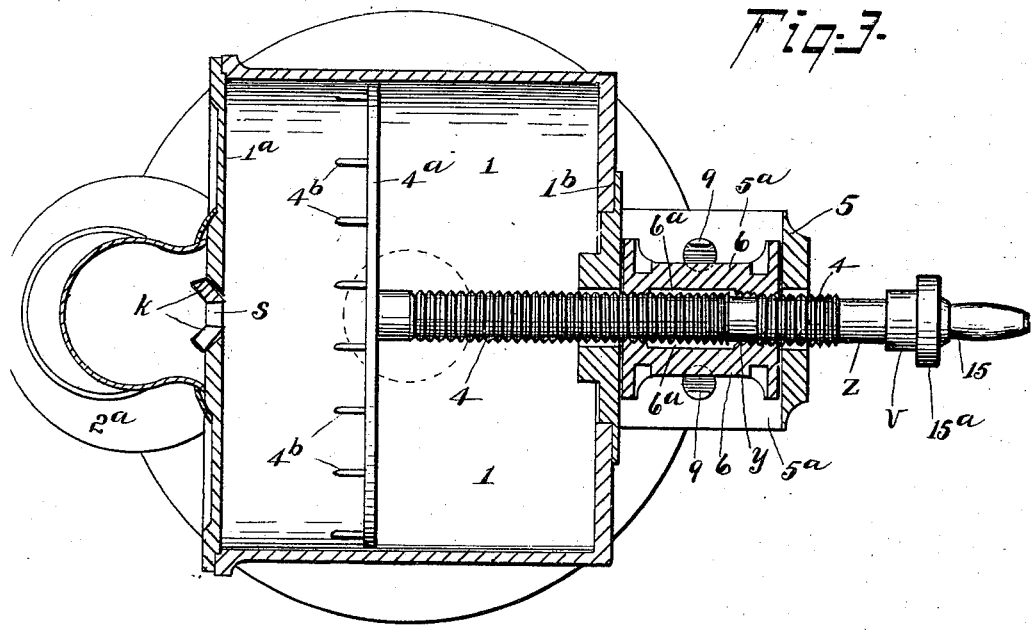
Figure 6:
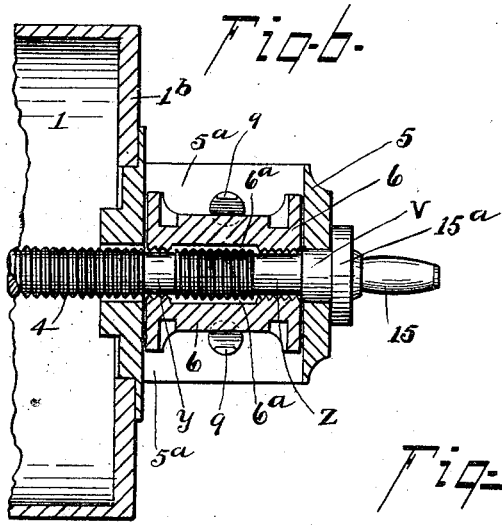
Figure 4:
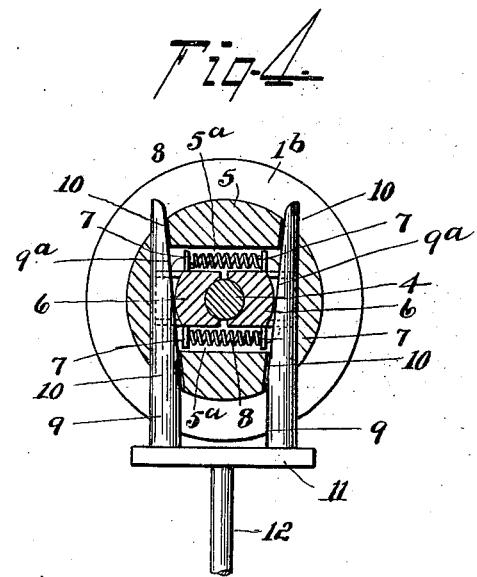
Figure 5:
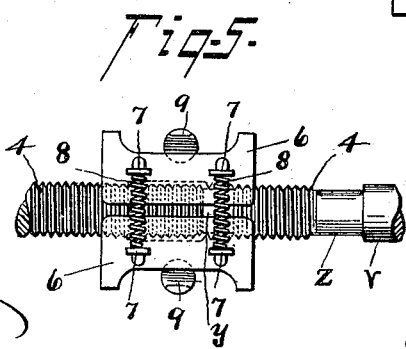

Figure 1 is a side elevation; Fig. 2, a section as on line 2 2, Fig. 1; Fig. 3, an enlarged section on line 3 3, Fig. 1; Fig. 4, an enlarged section on line 4 4, Fig. 1; Fig. 5, a section as on line 5 5, Fig. 4, omitting certain parts; Fig. 6, a section, broken away, similar to Fig. 3, but showing the screw-threaded shaft at its forward limit.

This invention relates to that kind of ice-shaving machines in which is comprised a suitable receptacle for the ice, cutting-knives in a slot or opening in one end of the latter, and a disk or head within said receptacle, which head is fixed to the end of a screw-threaded shaft that is rotatable in screw-threaded bearings of or connected to said receptacle. By suitably turning said shaft ice placed within the receptacle in front of the piston-head will be gradually forced against said cutting-knives. It has been customary in this kind of machines to employ a construction whereby when it is desired to enable the threaded shaft with its head to be quickly retracted so as to return the latter to the position farthest away from the cutting-knives—that is, into position to operate upon a new supply of ice—the threads of the shaft may be disengaged from the threaded bearings and retracted and then again engaged with said bearings.

My invention relates to means whereby the disengagement of the shaft from the threaded bearings and the return of the same to the normal or operative position are greatly facilitated.

The invention also relates to means for obviating liability of the head on the end of the said shaft coming into contact with the cutting-knives, and thus injuring the same, also liability of straining or breaking some part of the machine.

The invention relates, further, to certain details of construction hereinafter pointed out.

The exact nature of the improvement and invention will be hereinafter clearly described, reference being had to the drawings accompanying this specification and forming a part thereof.

In said drawings, 1 designates the usual ice-receptacle of cylindrical form that is mounted on a standard 2 and is provided with an opening at the top (not shown) through which the ice is placed in the receptacle. At the forward end of the latter is a head $1^a$, having the usual slot or opening $s$, and ice cutting or shaving knives $k$, Fig. 3. At the other or rear end of the receptacle is a head $1^b$.

4 is a central horizontal shaft extending into the receptacle, on the inner end of which shaft is fixed a head or disk $4^a$, with the usual pins or projections $4^b$, that are adapted to enter the ice so as to insure the rotation of the latter when the shaft is rotated. This shaft extends freely through openings in the end of a box or support 5, that is secured to the head $1^b$ of the receptacle. Within the said box are two similar pieces 6, whose inner semicirclular faces are provided with screw-threads corresponding with the threads of the shaft 4. These pieces when in the normal or operative position shown in the drawings are taken together in the nature of a nut on the shaft 4, but are adapted to slide horizontally in opposite directions in guideways $5^a$ of the box 5 away from the shaft 4 when it is desired to throw them out of engagement with the shaft, as hereinafter described. On the upper and lower sides of the said pieces are sets of projections 7 and between opposite ones thereof a helical expansion-spring 8, that tends to force the said pieces apart— that is, away from the shaft 4. The said pieces are, however, normally maintained in engagement with the shaft by means of two vertical bars 9, adapted to work in suitable guideways 10 of the box 5. The inner side of the upper part of each of the bars is inclined or flared outwardly at $9^a$, as seen in Figs. 2 and 4. The inclined part of one of the bars bears against the outer side of one of the pieces 6 and the corresponding part of the other bar against the outer side of the other piece, as seen in Fig. 4, the springs 8 pressing the two pieces outward against the said inclines.

The bars 9 are mounted on a cross-head 11 at the upper end of a rod 12, whose lower end is pivotally connected to a foot-lever 13, that is pivoted at $x$ to the standard 2. A suitable spring, such as a coiled spring 14, (indicated by dotted lines in Figs. 1 and 2,) operates to maintain the lever, and consequently the bars 9, normally in the elevated position shown in the drawings against the stress of springs 8, which, as before mentioned, tend to separate the pieces 6.

The lever 13 has an extension $13^a$ to receive the foot of the operator, which if placed on said extension with a downward pressure will cause the rod 12, and consequently the bars 9, to descend, and as they descend the pieces or half-nuts 6 will be permitted to slide apart in their bearings by the stress of the springs 8, and finally the pieces will be entirely disengaged from the shaft. The latter may then be readily retracted in order to bring back the head $4^a$ of shaft 4 adjacent to the rear end of the receptacle. The pressure on the lever 13 being now released and the bars moving up by the action of the spring 14 on the lever their inclined sides press the pieces 6 toward each other until their threads again engage the threads of the shaft. A supply of ice being placed within the receptacle (through the opening in the top before referred to) the shaft 4 is rotated in the proper direction by turning a crank 15 on the end of the shaft projecting beyond the box 5. It will be obvious that the ice will be rotated and at the same time gradually advanced against the cutting-knives, the shavings passing out of the slot $s$, whence they may be received by a vessel placed upon a support $2^a$, extending horizontally from the standard 2. In order to facilitate the retraction of the shaft 4 when the pieces 6 are disengaged therefrom, as before described, and also to avoid marring the threads of the shaft, I usually provide two transverse sheaves 16, one at each end of the box 5, as seen in Fig. 2 and indicated by dotted lines in Fig. 1. These sheaves are mounted on suitable shafts $16^a$ and are in position to receive the shaft when the pieces 6 are disengaged therefrom, as clearly shown in Fig. 2.

I shall now describe the means or devices which I employ in order to prevent the head $4^a$ or its studs $4^b$ from coming into contact with and thus damaging or dulling the cutting-knives. Particular reference being now had to Figs. 3 and 6, it will be seen that the pieces 6 are provided with screw-threads only at and adjacent to the ends thereof, the intervening portion $6^a$ being devoid of threads. It will also be observed that the shaft 4 is devoid of screw-threads for a certain distance at $y$, Figs. 3 and 6, and also that there is a part $z$ of the shaft beyond the outer end of the threaded portion that is devoid of the threads. The length of the threaded part between the plain or unthreaded part $y$ and $z$ is preferably somewhat less than the length of the before-mentioned unthreaded portion $6^a$ of the pieces 6. The relative arrangement of the said threaded and unthreaded parts is such that at a point in the advance movement of the shaft 4, which point is when the head $4^a$, or rather the projections $4^b$ thereof, has been brought in proximity to the forward head $1^a$ of the receptacle, the threaded part of the shaft in advance of the plain part $y$ passes beyond the threads of the forward end of the pieces 6, while the threaded part of the shaft between the plain parts $y$ and $z$ of the shaft passes on beyond the threads of the rear ends of the said pieces, the said two plain portions of the shaft then coming, respectively, opposite the threaded parts of the pieces 6, all as seen in Fig. 6. Thus, while the turning of the shaft may continue it cannot then advance, and so the projections $4^b$ cannot come into contact with the head $1^a$ of knives. In order to prevent accidental pushing in of the shaft after it has reached the inoperative position, as just described, it is necessary to provide a suitable stop. In the present instance the part $v$ of the shaft beyond the plain portion $z$ is enlarged, thus forming an offset that stops against the rear end of the pieces 6, or such stop might be had by the hub $15^a$ of the crank 15 abutting against the end of the box 5, as seen in Fig. 6.

In order to insure that a part of both of the threaded portions of the shaft 4 shall always engage the threaded parts, respectively, of the pieces 6 until both of said threaded parts of the shaft shall pass out of engagement with the respective threaded parts of the pieces simultaneously, I make the rear threaded part of said pieces of somewhat greater length than the threaded part of the forward end of the pieces, as shown in Figs. 3 and 6. This difference in length of said threaded portions with relation to the threaded and plain portions of the shaft 4 is such, as shown, that when the threaded part of the latter forward of the plain part $y$ of the shaft escapes from the forward threaded part of the pieces 6 the threaded portion of the shaft to the rear of said plain part at the same time escapes from the rear threaded part of said pieces.

I do not limit myself to the precise form of the invention shown in the drawings, as the same may be varied without departing from the principle of the invention. For example, there may be used in lieu of the expansion-springs similar springs, but tending to draw the pieces toward each other and the shaft, and the bars, &c., constructed and arranged to force the pieces apart against the stress of such springs. I may also remark that although I have described the invention as embodied in a machine for shaving ice the same may be applied to other purposes.

Having thus described my invention, I claim as new and desire to secure by Letters Patent—

1. In a machine of the kind recited, the combination of the receptacle, the cutting-knives, the rotatable screw-threaded shaft extending within said receptacle, the head or disk on said shaft, the box, the pieces adapted to slide in guideways of said box and having screw-threads adapted to engage the threads of said shaft, the springs acting on said pieces, the longitudinally-movable bars having the inclined sides adapted to engage the sides of said pieces, whereby their threads are normally held in engagement with the threads of said shaft, substantially as and for the purpose set forth.

2. In a machine of the kind recited, the combination of the receptacle, the cutting-knives, the rotatable screw-threaded shaft extending within said receptacle, the head or disk on said shaft, the box, the spring-controlled pieces adapted to slide in guideways of the latter, and having screw-threads adapted to engage the threads of said shaft, the bars having the inclined sides adapted to engage the sides of said pieces, the spring-controlled lever, and the rod connecting said lever and bars, substantially as and for the purpose set forth.

3. In a machine of the kind recited, the combination of the receptacle, the cutting-knives, the rotatable shaft extending within said receptacle, and having the forward and rear threaded portions, and the portion devoid of threads intervening between said threaded portions, and having also the portion devoid of threads beyond the outer end of said rear threaded portion, the slidable pieces having the end portions thereof provided with screw-threads adapted to engage the threads of said shaft, and having the intervening portion devoid of threads of somewhat greater length than that of the said rear threaded portion of the shaft, means for maintaining said pieces normally in position wherein their threads will be in engagement with the threads of the shaft, and means for effecting a sliding movement in opposite directions to disengage the same from said shaft, substantially as and for the purpose set forth.

4. In a machine of the kind recited, the combination of the receptacle, the cutting-knives, the rotatable screw-threaded shaft extending within said receptacle, the separable pieces having screw-threads adapted to engage the threads of said shaft, means for maintaining said pieces normally in position to engage the threads of said shaft, means for moving said pieces in opposite directions to disengage the same from said shaft, together with the rollers normally out of contact with said shaft, and adapted to receive and support the same when said pieces are disengaged from the shaft, substantially as and for the purpose set forth.

In testimony whereof I have hereunto affixed my signature this 19th day of February, A. D. 1900.

FISHER H. LIPPINCOTT.

Witnesses:
LOUIS MUELLER,
WALTER C. PUSEY.